United States Patent
Wang et al.

(10) Patent No.: US 7,508,994 B2
(45) Date of Patent: Mar. 24, 2009

(54) METHOD FOR DETECTING STREAKS IN DIGITAL IMAGES

(75) Inventors: Shen Wang, Webster, NY (US); Greg L. Archer, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 442 days.

(21) Appl. No.: 11/294,298

(22) Filed: Dec. 5, 2005

(65) Prior Publication Data

US 2007/0126893 A1 Jun. 7, 2007

(51) Int. Cl.
*G06K 9/40* (2006.01)
*H04N 5/217* (2006.01)

(52) U.S. Cl. ........................... 382/275; 348/241
(58) Field of Classification Search .............. 382/275
See application file for complete search history.

(56) References Cited

U.S. PATENT DOCUMENTS

| | | | | |
|---|---|---|---|---|
| 5,065,444 A | * | 11/1991 | Garber | 382/275 |
| 5,526,113 A | | 6/1996 | Lengyel et al. | |
| 5,881,182 A | * | 3/1999 | Fiete et al. | 382/275 |
| 5,960,097 A | * | 9/1999 | Pfeiffer et al. | 382/103 |
| 6,584,233 B1 | * | 6/2003 | Kane et al. | 382/254 |
| 6,697,507 B1 | * | 2/2004 | Chapman | 382/131 |
| 6,912,322 B2 | * | 6/2005 | Smith et al. | 382/275 |
| 2002/0114533 A1 | * | 8/2002 | Smith et al. | 382/275 |
| 2003/0012441 A1 | | 1/2003 | Trifonov et al. | |
| 2006/0222261 A1 | * | 10/2006 | Archer et al. | 382/275 |
| 2006/0228042 A1 | * | 10/2006 | Archer et al. | 382/275 |

OTHER PUBLICATIONS

Gonzalez, Digital Image Processing 2/E, 201, Prentice Hall, 2. p. 119, 159, 266-269.*

* cited by examiner

*Primary Examiner*—Jingge Wu
*Assistant Examiner*—Max Shikhman
(74) *Attorney, Agent, or Firm*—Peyton C. Watkins

(57) ABSTRACT

The present invention uses five regions of interest, 4 corners and 1 center to do Fourier Transform analysis to mark rough location of the streaks, if there is any. It sets the small window around the center in each Fourier Transform ROI to zero to mask the cluster of bright points caused by the lens rolloff or other noises. It use iterative linear regression to remove the random outliers and to search the best possible linear pattern. If it finds any streaks, it calculates the angle and converts it to the streak angle in spatial domain. Once a streak is detected, it can be removed by applying an inverse Fourier Transform on the processed magnitude and original phase Fourier Transform images.

20 Claims, 7 Drawing Sheets

METHOD FOR DETECTING STREAKS IN DIGITAL IMAGES

FIELD OF THE INVENTION

The invention relates generally to the field of detecting and removing noise, such as streaks, from images and the like. More specifically, the invention relates to applying a frequency transform, such as a Fourier transform, to an image for detecting streaks in the image which may be quantified and removed. The present invention also includes an improved method of detecting streaks in images, especially flat-field images or images having known transform characteristics.

BACKGROUND OF THE INVENTION

Prior art algorithms used an edge detection algorithm in the spatial domain to identify discontinuities in the image data and measure the change in intensity taking place over a number of pixels. It is difficult to set the threshold to detect bright pixels which may contribute to an edge due to the noise in the image. It is also difficult to set a region of interest and the criteria to calculate the defect density; susceptible to false detection due to lens roll off or edge effect.

U.S. patent application Ser. No. 11/180,816, filed Jul. 13, 2005, entitled "The Use Of Frequency Transforms In The Analysis Of Image Sensors", by Greg L. Archer, et al. uses a single linear regression algorithm in the frequency domain to identify a linear pattern in the center of the image.

Although the currently known and used methods for detecting and removing streaks is satisfactory, improvements are always desirable. The present invention provides such an improvement.

SUMMARY OF THE INVENTION

The present invention is directed to overcoming one or more of the problems set forth above. Briefly summarized, according to one aspect of the present invention, the invention uses five regions of interest, 4 corners and 1 center to do Fourier Transform analysis to mark rough location of the streaks, if there is any. It sets the small window around the center in each Fourier Transform ROI to zero to mask the cluster of bright points caused by the lens rolloff or other noises. It use iterative linear regression to remove the random outliers and to search the best possible linear pattern. If it finds any streaks, it calculates the angle and converts it to the streak angle in spatial domain. Once a streak is detected, it can be removed by applying an inverse Fourier Transform on the processed magnitude and original phase Fourier Transform images.

Advantageous Effect of the Invention

The present invention has the following advantage of applying a frequency transform to an image and then applying an iterative regression technique for improved streak noise detection and removal.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

It is also noted that the present invention may be used for image evaluation, image sensor testing, and image manipulation in addition to detecting and removing streaks.

Figure 1:
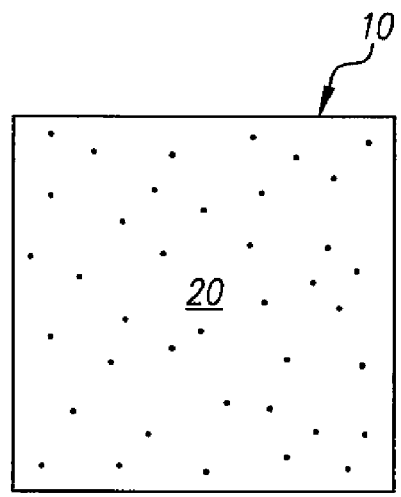
FIG. 1 is a typical image containing noise.

Referring to FIG. 1, there is shown a typical image 10 having noise 20 therein. The noise 20 may be perceptible to the human eye or substantially non-perceptible to the human eye in which case of non-perceptibility the image will appear grainy or the like. The present invention detects and removes streaks from the image as described herein below.

Figure 2:
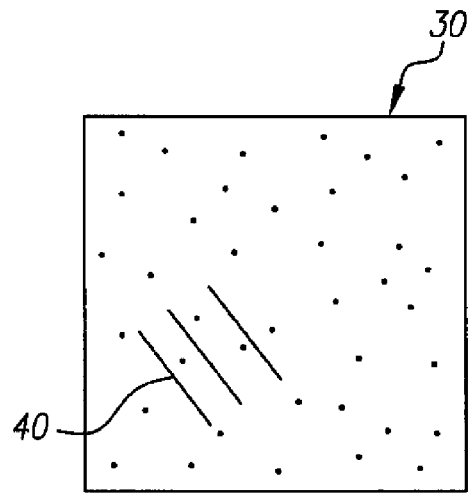
FIG. 2 is a typical image with a streak type noise.
Figure 3:
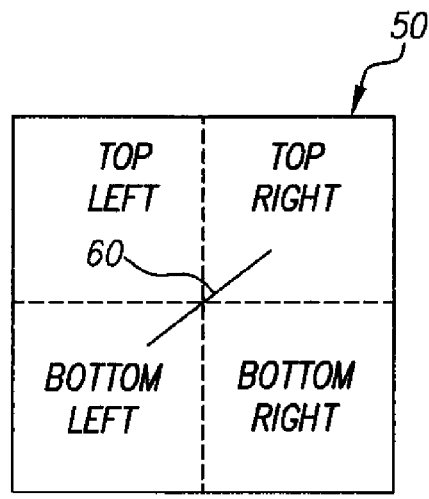
FIG. 3 is the resulting magnitude image of FIG. 2 after applying the discrete Fourier transform.

An example of an image 30 with a streak type noise 40 is shown in FIG. 2. The image 30 illustrates a streaking noise 40. Applying a discrete Fourier transform to the image of FIG. 2 results in the magnitude image 50 shown in FIG. 3 in the frequency domain. In this magnitude image, a line pattern 60 is shown positioned across the center which corresponds to the noise 40 in the spatial domain. The image is separated into four quadrants for facilitating the operation of the software program of the present invention.

Figure 4A:
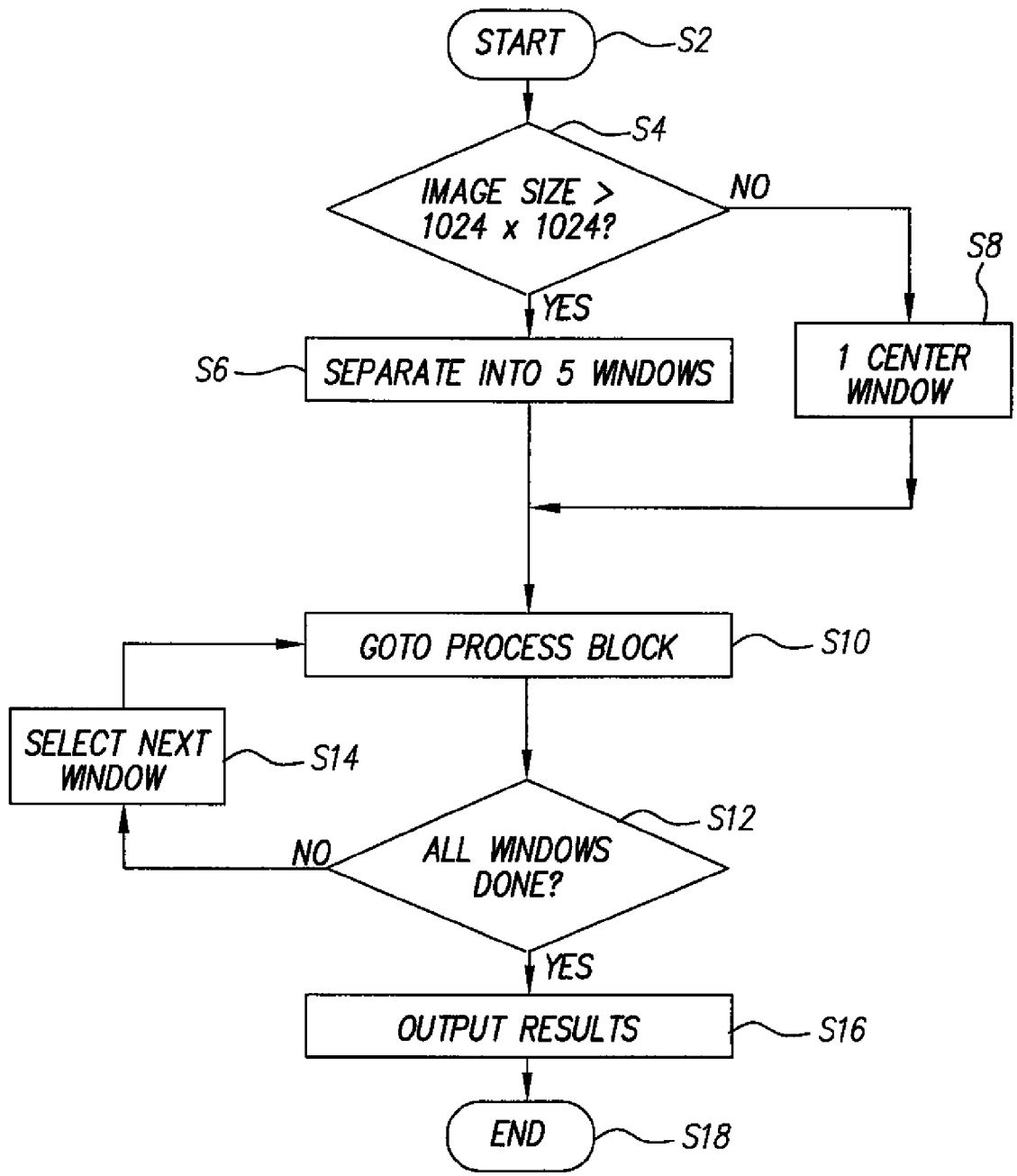
FIGS. 4A-D are flow charts of the software program of the present invention.

FIGS. 4A-4D are the flowcharts of the software program of the present invention. Referring to FIG. 4A, the program is started S2 and the resolution of the digital image 30 is obtained for determining whether the image size or resolution is a power of two S4. If it is greater than 1024×1024, the whole image is separated into five windows S6 and each window size is 1024×1024. The five windows are the top left, bottom left, top right, bottom right and the center. Otherwise, it uses only one center window S8 and its window size is chosen to the nearest size of a power of two. If original size is not of a power of 2, zero padding is required. All the windows need to be processed S10 as described in the following paragraph. After one window is processed, check if all of them are done S12. If not, select next window S14 and process again S10 until all windows are processed. Then it outputs results S16 and ends the program S18.

Figure 4B:
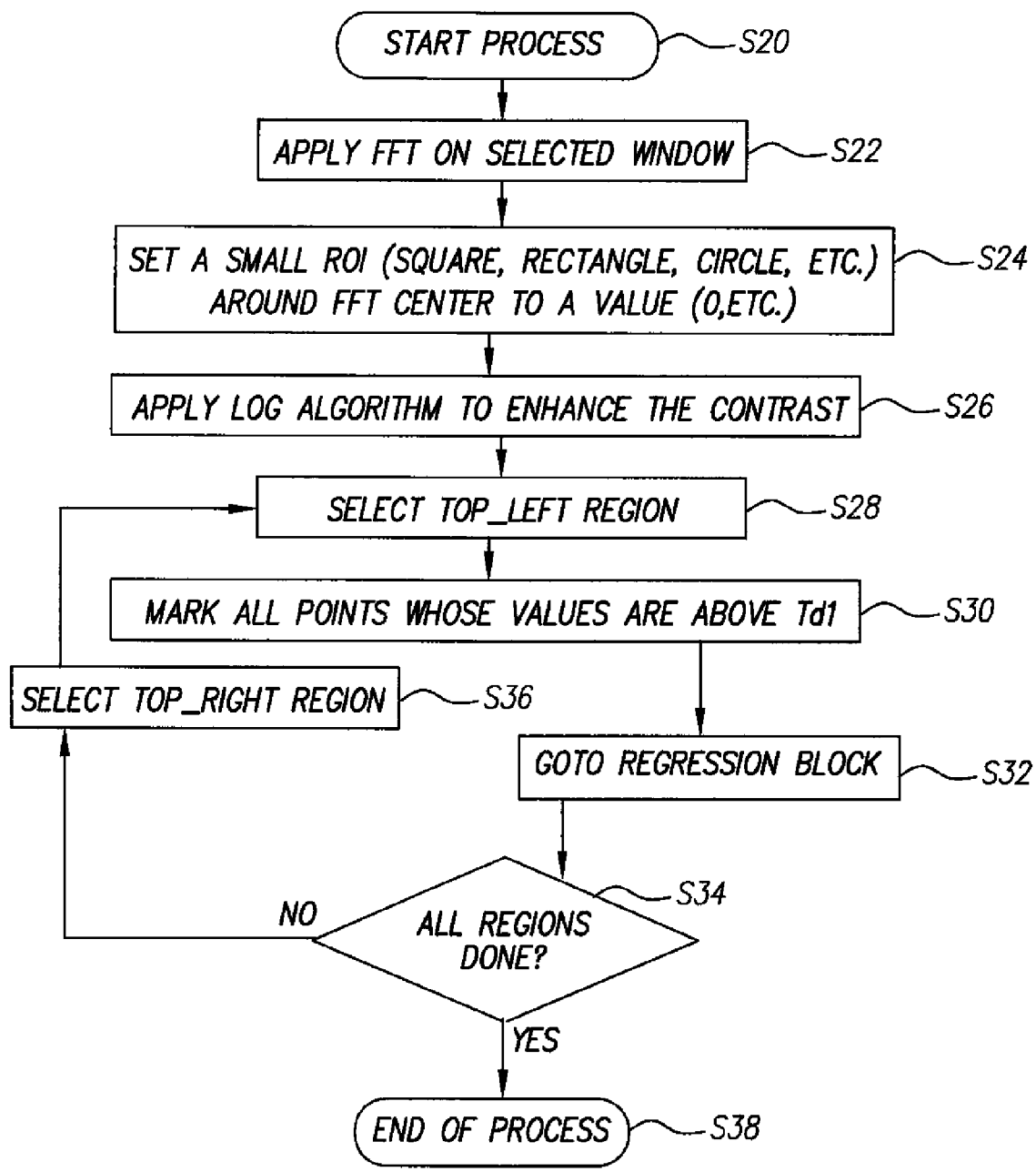

Referring to FIG. 4B, the process (referred to as S10) block starts S20 with applying a Fourier transform on the image in selected window S22. Once the magnitude image 50 of the transform is obtained, the center region in the magnitude image 50 is set to a predefined value, preferably zero, S24. The purpose of this operation is to remove the noise points around the center. The size of the region is determined by the noise level, preferably $1/16^{th}$ of the size of 4 regions which will be discussed in the next paragraph. The region can be a circle, a square or an eclipse or a rectangle or any other shapes. A logrithm operation is then applied S26 to the whole magnitude image 50 to increase the contrast of the image. A detailed description on the logarithm operation will be described in detail herein below.

There are four regions (as referred to in FIG. 3) around the center point, top right, top left, bottom right and bottom left. Since the top right and bottom left are mirror images, the same as top left and bottom right, preferably only two regions need to be processed, for example the top left and top right regions. First the top left region is selected S28. Then all the pixel values are compared against a predefined threshold value Td1, preferably the mean plus 3 times of standard deviation of the all pixel values inside the region, S30. If any pixel value is above this threshold, it is marked as a bright point. A linear regression process is applied on all marked bright points S32 (as will be discussed in detail in FIG. 4C). After that, check if all regions have been selected S34. If no, select the top right region S36 and repeat the procedures of S30 and S32. After all regions have been processed, it reaches the end of process S38.

Figure 4C:
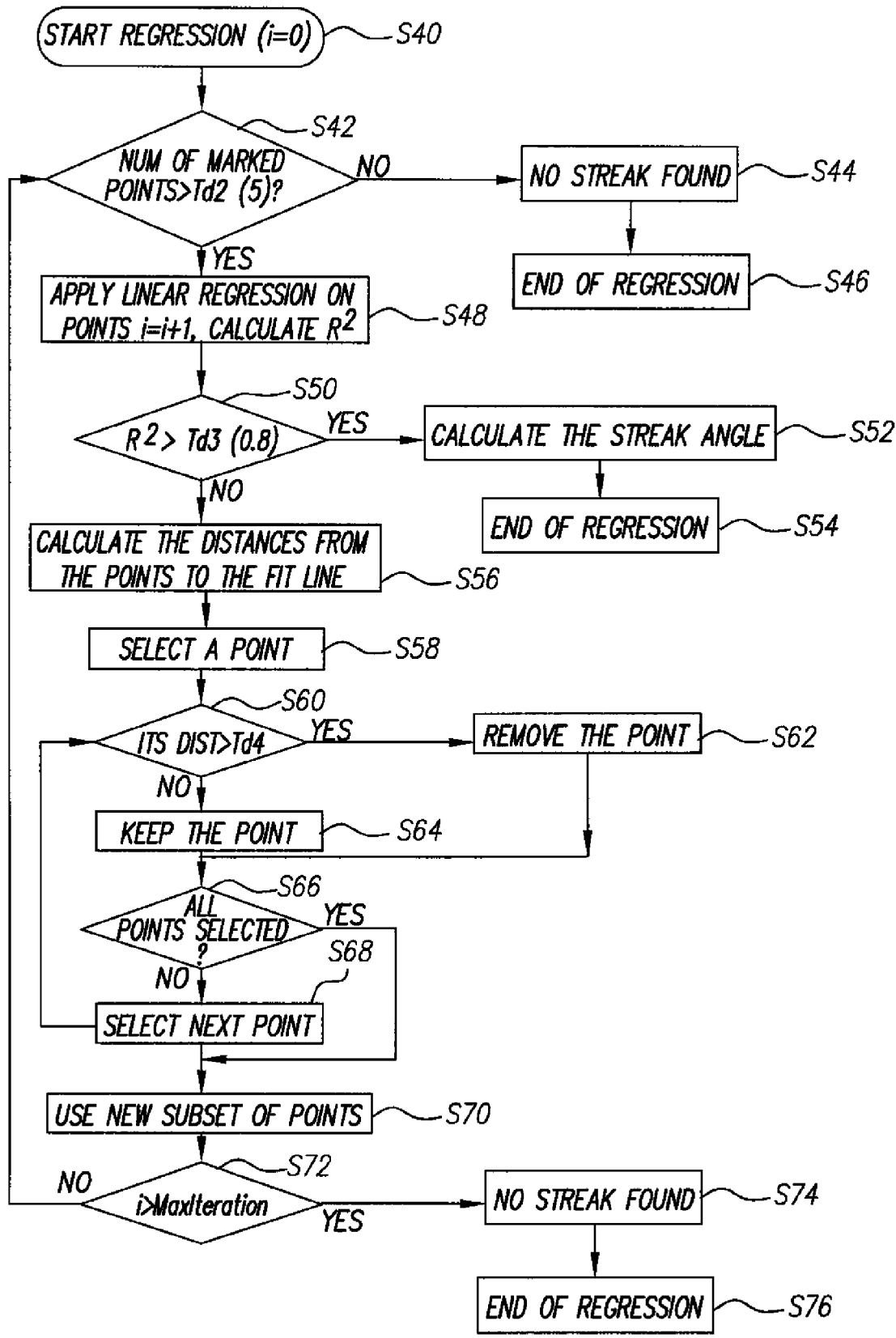

Referring to FIG. 4C, the regression block starts S40 and its regression counter resets to 0. The program first checks if the total marked points are above a predefined threshold Td2, preferably 5 and above, S42. If the total bright points are fewer than 5, no streaks are found S44 and it reaches the end of regression S46. If there are 5 or more bright points, a first linear regression is applied to the marked points S48 and regression count increases by 1. Then the R-Square value of the best fit line from the regression is calculated. If it is above another predefined threshold Td3, preferably 0.8, S50, a streak is found and its angle is calculated S52 and it reaches the end of regression S54. A detailed description on how to calculate the streak angle is given later (FIGS. 5A-C).

Figure 5A:
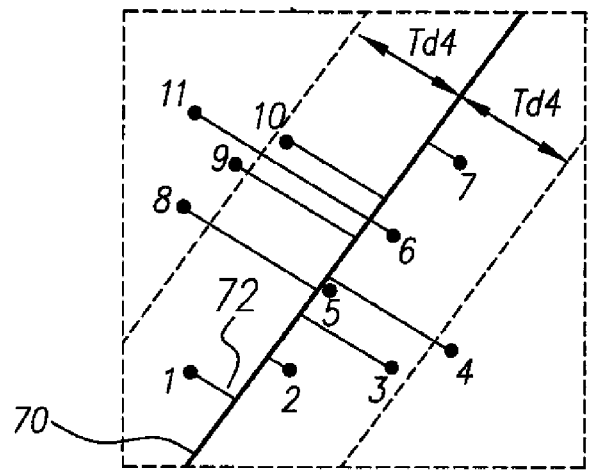
FIGS. 5A-C are illustrations of the regression technique of the present invention.

Referring to FIGS. 4C and 5A, if R-Squared of the fit line 70 is less than the Td3, all the distances between the marked points (1-11 in FIG. 5A) to the fit line 70 are calculated S56. The first point is selected S58. If its distance to the fit line is greater than a threshold value Td4, preferably the mean of the all distances, S60, the point is considered an outlier and is removed from the original group of all marked points S62. On the other hand, if the distance is within the threshold Td4, the point is kept in the group S64. After that, the program checks if all points have been processed S66. If not, the next point is selected and the whole comparison process is repeated S68 until all the points are processed and the new subset of points are determined S70. This concludes one cycle of regression. If the number of regression is greater than the MaxIteration, preferably 5 iterations, S72, no streak is found S74 and it ends the regression S76. If the number of regression is smaller than the MaxIteration, the program will use the new subset of points as the marked points (illustrated as points 1, 2, 3, 5, 6, 7 and 10 in FIG. 5B) and repeat the process from S42. The other points (4, 8, 9 and 11) are removed because their distance is greater than the threshold of Td4.

Figure 5B:
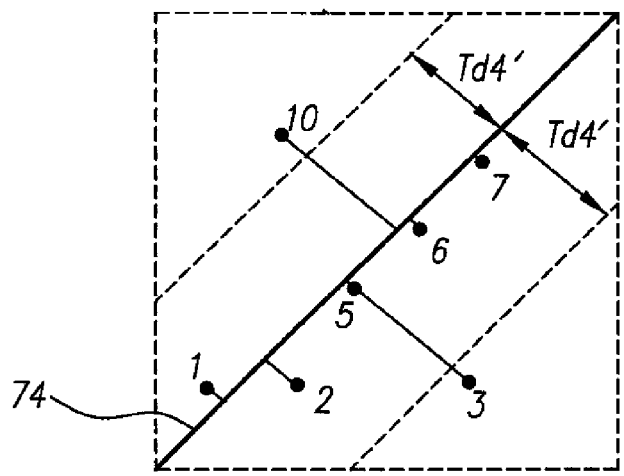
Figure 5C:
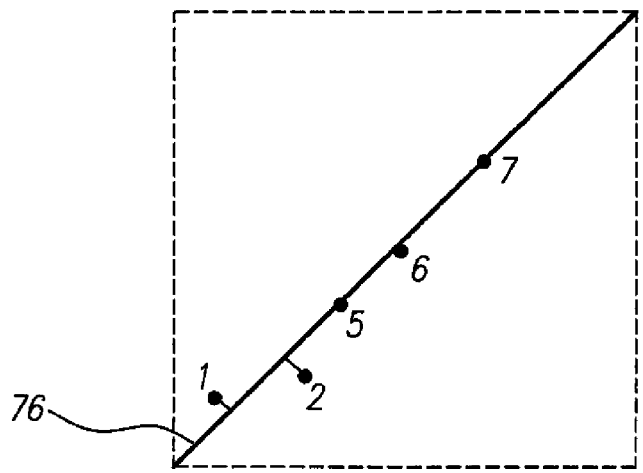

Referring to FIG. 5B, another fit line 74 is calculated from the new subset of points. Assuming the R-Squared of the fit line 74 is less than Td3, then the distances from the remaining points to the fit line 74 are calculated. This distance is compared to the threshold Td4' (the mean of all the new distances, theoretically smaller than Td4). For all distances smaller than Td4', these points are kept for the new subset of points (points 1, 2, 5, 6, and 7) for further processing. If the R-Squared of the fit line 76 from the latest subset points (1, 2, 5, 6, and 7) is greater than Td3, then the regression is finished and a streak is found. Referring to FIG. 5C, the slope of the fit line 76 from the remaining points is calculated. The angle of the streak is calculated based on this slope 76, i.e., perpendicular to the angle of the fit line 76.

Figure 4D:
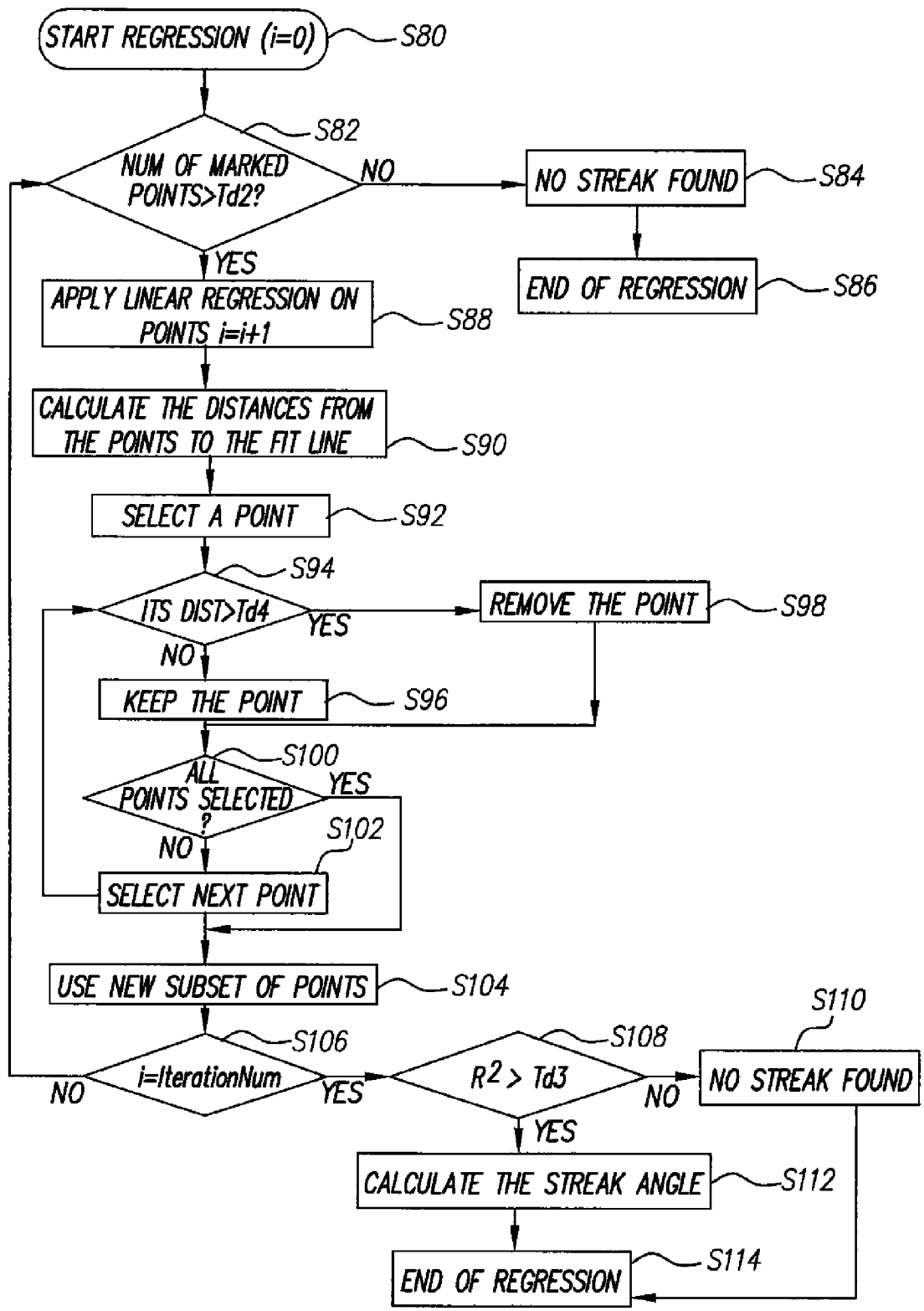

Referring to FIG. 4D, another embodiment of this invention is to apply a fixed and predefined number of regression cycles, preferably 5, and then to evaluate the streak angle. It is noted for clarity of understanding that FIG. 4D is an alternative embodiment of FIG. 4C. It starts S80 and resets the iteration counter to 0. It uses the first set of marked points to compare a predefined threshold Td2 S82. If the marked points are fewer than the Td2, no streaks are found S84 and the regression session will end S86. If the points are more than the Td2, the first linear regression is applied S88 and the iteration counter advances by 1. Then the distances from all the points to the fit line are calculated S90. After that, the first point is selected S92 and its distance to the fit line is compared to another threshold Td4 S94. If the distance is greater than Td4, the point is removed from the original group S98. If it is not, the point is kept in the ground S96. After that, the program checks if all points have been processed S100. If not, next point is selected S102 and the whole comparison process is repeated S94 until all the points are processed and the new subset of points are determined S104. This concludes one cycle of regression. If the number of regressions is smaller than the IterationNum (5) S106, the program will use the new subset of points as the marked points and repeat the process from S82. If, on the other hand, the number of regression equals IterationNum, the final R-Squared of the fit line is calculated S108 and is compared to a predefined value Td3. If it is less than Td3, no streak is found S110 and the regression ends S114. However, the R-Squared is greater than Td3, the streak angle is calculated S112 followed by the end of the regression S114.

The Fourier transform used in the present invention S22 is preferably applied to each row and then applied again vertically to each column. It is noted that Fourier transform is the preferred embodiment, but other transform methods may also be used. The two transforms together result in a magnitude image or plot. Typically, Fourier transforms that may be used are, but not limited to, fast Fourier transform (Fourier Transform) by Cooley and Tukey and discrete fast Fourier transforms by Danielson-Lanczos. The use of the Fourier transform provides the separation of the frequency content in the original image. Low frequency values represent little or no change in the image (overall shape), while high frequency values indicate rapid changes in the image over a short distance (details). Because there are discrete, equally spaced pixels in a digital image, it becomes efficient to use a Discrete Fourier Transform (DFT) version of the general Fourier transform.

The result of the DFT will be a magnitude image and a phase image. The magnitude image will provide equally spaced data representing the frequency domain. Different frequencies are represented at different distances from the origin. The value at the origin represents the DC component or average value of the original image data while values off of the origin represent different orientations in the original image. The pixel value or energy in the frequency domain indicates how much of that frequency and orientation is present in the original image.

The DFT calculation is shown as:

$$X(k) = \frac{1}{N}\sum_{n=0}^{N-1} x(n) e^{-j\frac{2\pi nk}{N}} \quad \text{for } k = 0, 1, 2, \ldots, N-1$$

$N = \#$ data samples $x(n) = $ data for $n = 0, 1, 2, \ldots, N-1$ $$e^{-j\frac{2\pi nk}{N}} = \cos\frac{2\pi nk}{N} - j\sin\frac{2\pi nk}{N}$$

The exponent has an imaginary (j) term, making the result complex (real and imaginary values), even though the original image values were real. The magnitude and phase are calculated as follows:

$$\text{magnitude} = |X(k)| = \sqrt{x_r^2 + x_i^2} \quad \text{phase} = \tan^{-1}\left(\frac{x_i}{x_r}\right)$$

An area image sensor with dimension M×N is illuminated with uniform light. The image data f(x,y) from the image sensor is an M×N array of voltages, one for each pixel from the image sensor.

The two-dimensional DFT of an image f(x,y) of size M×N is given by the equation $$F(u, v) = \frac{1}{MN} \sum_{x=0}^{M-1} \sum_{y=0}^{N-1} f(x, y) e^{-j2\pi(ux/M + vy/N)}$$

and the magnitude image equals the absolute value of F(u,v).

In order to speed up the DFT calculation, a variant of DFT called fast Fourier transform (Fourier Transform) was developed in 1965. The requirement for utilizing the Fourier Transform algorithm is the x and y dimensions must each be a power of 2, such as 256×256, 512×512, 256×512, and 1024×1024. If the image size is not perfect power of 2, zero or average padding is needed. In this example, a 1024×1024 window region of interest is selected.

After the Fourier Transform of the image is obtained, the pixel in the frequency domain that represents the average value in the original image is set to zero. Then a logarithm transform (S26) is applied to the magnitude image to boost the low magnitudes of peaks related to various frequencies. The transform is given by $$S(u,v) = \ln(1 + |F(u,v)|)$$

In this example, the threshold value is the median value of S(u,v) in the quadrant. Then a linear regression of these thresholded values is performed based on the theory that a line should be present in the S(u, v) data which is perpendicular to the streak in the original captured image. The linear regression calculates a coefficient of correlation, R, which is compared with a pre-defined threshold value Td3. If R from the linear regression is greater than the predefined threshold value Td3, then the streak is detected. The fit line angle is calculated based on the equation angle=atan(slope) where the slope is calculated from the linear regression.

The streak angle is calculated (S52 and S112) due to the fact the streak angle is always perpendicular to the fit line angle.

Once a streak is detected based on the marked points at the end of regression, the points are preferably set to zero or alternatively substantially zero. Then the modified magnitude image in frequency domain along with the original phase image can be reversely transformed back to an original spatial image with the detected streak removed.

The digital image can be obtained by various methods. It can be captured by any imaging devices like a camera with an image sensor inside, an image scanner and etc. It can also come from a traditional film camera or film X-ray machine. After the image is formed on these traditional film medium, it can be digitized to a digital image.

Figure 6:
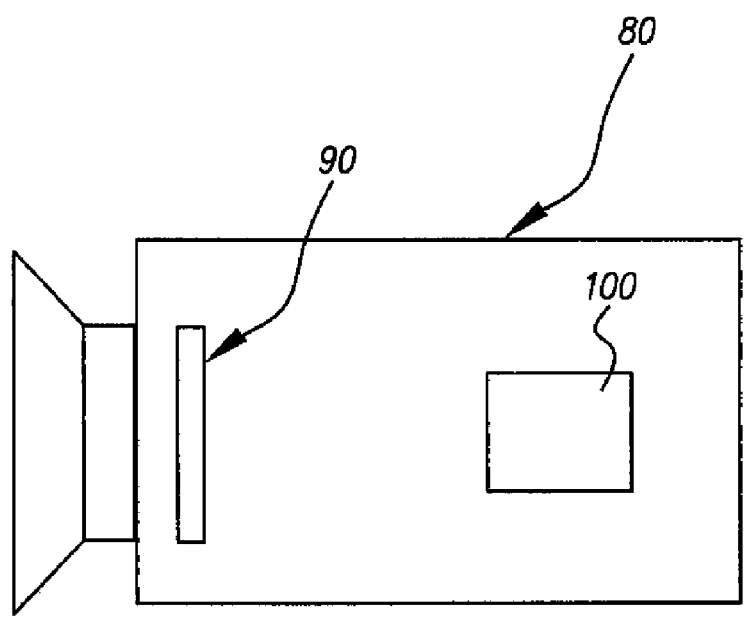
FIG. 6 is a digital camera for illustrating a typical commercial embodiment for which the present invention is used.

Referring to FIG. 6, there is shown a digital camera 80 having the software program of the present invention installed in memory 90 and processed by a digital signal processor 100 for detecting and removing noise after image capture. This illustrates one of the above-described embodiments.

The invention has been described with reference to two preferred embodiments. However, it will be appreciated that variations and modifications can be effected by a person of ordinary skill in the art without departing from the scope of the invention.

PARTS LIST

10 Normal flat field image with random noise
20 Random noise
30 Flat field image with streak noise
40 Streak Noise
50 FFT Magnitude Image in Frequency Domain
60 A line pattern corresponding to the streak noise
70 The fit line of $1^{st}$ regression
74 The fit line of $2^{nd}$ regression
76 The final fit line
80 Digital camera
90 Memory
100 Digital signal processor
S2-S114 Flowchart steps

The invention claimed is:

1. A method for detecting noise in an image, the method comprising using a processor to perform the steps of:
    (a) applying a frequency transform to the image for obtaining a magnitude image in a frequency domain;
    (b) comparing a threshold value to values of the magnitude image for obtaining first thresholded values;
    (c) applying a regression to one or more thresholded values for obtaining an estimated best fit line;
    (d) determining a correlation factor from the estimated best fit line;
    (e) if the correlation factor does not meet a predetermined value, applying a second threshold to the first thresholded values to obtain second thresholded values which are a subset of the first thresholded values and repeating steps (c) and (d); and
    (f) if the correlation factor meets the predetermined value, calculating a streak angle where the streak angle is perpendicular to an angle of the best fit line.

2. A method for detecting noise in an image, the method comprising using a processor to perform the steps of:
    (a) applying a frequency transform to the image for obtaining a magnitude image in a frequency domain;
    (b) comparing a threshold value to values of the magnitude image for obtaining first thresholded values;
    (c) applying a regression to one or more first thresholded values for obtaining an estimated best fit line;
    (d) applying a second threshold to the first thresholded values to obtain second thresholded values which are a subset of the first thresholded values;
    (e) repeating steps (c) and (d) n times; where n is zero or more; and
    (f) calculating a streak angle, if any, wherein the streak angle is perpendicular to an angle of the best fit line.

3. The method as in claim 2 further comprising the step of determining a correlation factor from the estimated best fit and calculating the streak angle, if any, based on results of the correlation factor.

4. The method as in claim 3 further comprising the step of comparing the correlation factor with a predetermined value before calculating the streak angle.

5. The method as in claim 1 further comprising the step of segmenting the image into n windows, where n is one or more, before step (a).

6. The method as in claim 5 further comprising the step of removing noise by setting a range of interest round a fast fourier transform center to a predefined value.

7. The method as in claim 6 wherein the predefined value is one.

8. The method as in claim 7 further comprising the step of applying a logarithm transform to the magnitude image to enhance contrast.

9. The method as in claim 2 further comprising the step of setting the thresholded values which are a result of a final reiteration from step (e) to zero or substantially zero.

10. The method as in claim 9 further comprising the step of applying an inverse frequency transform on the magnitude image and a phase image for removing the noise from the image.

11. An image capture device for detecting noise in an image, the image capture device comprising:
  (a) a frequency transform applied to the image for obtaining a magnitude image in a frequency domain;
  (b) a threshold value compared to values of the magnitude image for obtaining first thresholded values;
  (c) a regression applied to one or more first thresholded values for obtaining an estimated best fit line;
  (d) a second threshold applied to the first thresholded values to obtain second thresholded values which are a subset of the first thresholded values; and
  (e) a processor that determines a streak angle, if any, wherein the streak angle is perpendicular to an angle of the best fit line.

12. The image capture device as in claim 11 further comprising a correlation factor determined from the estimated best fit and calculating the streak angle, if any, based on results of the correlation factor.

13. The image capture device as in claim 12, wherein the correlation factor is compared with a predetermined value before calculating the streak angle.

14. The image capture device as in claim 11, wherein the image is segmented into n windows, where n is one or more, before step (a).

15. The image capture device as in claim 14, wherein noise is removed by setting a range of interest around a fast fourier transform center to a predefined value.

16. The image capture device as in claim 15 wherein the predefined value is one.

17. The image capture device as in claim 16 further comprising a logarithm transform that is applied to the magnitude image to enhance contrast.

18. The image capture device as in claim 12, wherein the thresholded values are set to zero or substantially zero.

19. The image capture device as in claim 18 further comprising an inverse frequency transform applied on the magnitude image and a phase image for removing the noise from the image.

20. The method of claim 1, further comprising the steps of:
  (g) if the correlation factor does not meet another predetermined value after performing step (e), applying a subsequent threshold to the second thresholded values to obtain subsequently thresholded values which are a subset of the second thresholded values;
  (h) repeating steps (c) and (d);
  (i) if the correlation factor meets another predetermined value, calculating a streak angle where the streak angle is perpendicular to an angle of the best fit line;
  (j) if the correlation factor does not meet the other predetermined value, applying another subsequent threshold to the previously thresholded values to obtain new subsequently thresholded values which are a subset of the previously thresholded values; and
  (k) repeating steps (c), (d) and (j) until the correlation factor meets the predetermined value or until steps (c), (d) and (J) are repeated a maximum number of times.

* * * * *

UNITED STATES PATENT AND TRADEMARK OFFICE
CERTIFICATE OF CORRECTION

PATENT NO. : 7,508,994 B2  
APPLICATION NO. : 11/294298  
DATED : March 24, 2009  
INVENTOR(S) : Shen Wang et al.

Page 1 of 1

It is certified that error appears in the above-identified patent and that said Letters Patent is hereby corrected as shown below:

| | |
|---|---|
| On the title page, column 2, (other Publications) | Delete "201" and insert --2001--. |
| Column 7, line 5 | Delete "round" and insert --around--. |
| Column 8, line 37 | Delete "(J)" and insert --(j)--. |

Signed and Sealed this

Thirtieth Day of June, 2009

JOHN DOLL  
*Acting Director of the United States Patent and Trademark Office*